March 3, 1970 — J. R. REISS — 3,498,643
SWIVEL FLANGED FITTING
Filed Nov. 21, 1967 — 2 Sheets-Sheet 1

INVENTOR.
JOHN R. REISS
BY
*A. A. Steinmeier*
ATTORNEY

March 3, 1970  J. R. REISS  3,498,643
SWIVEL FLANGED FITTING
Filed Nov. 21, 1967  2 Sheets-Sheet 2
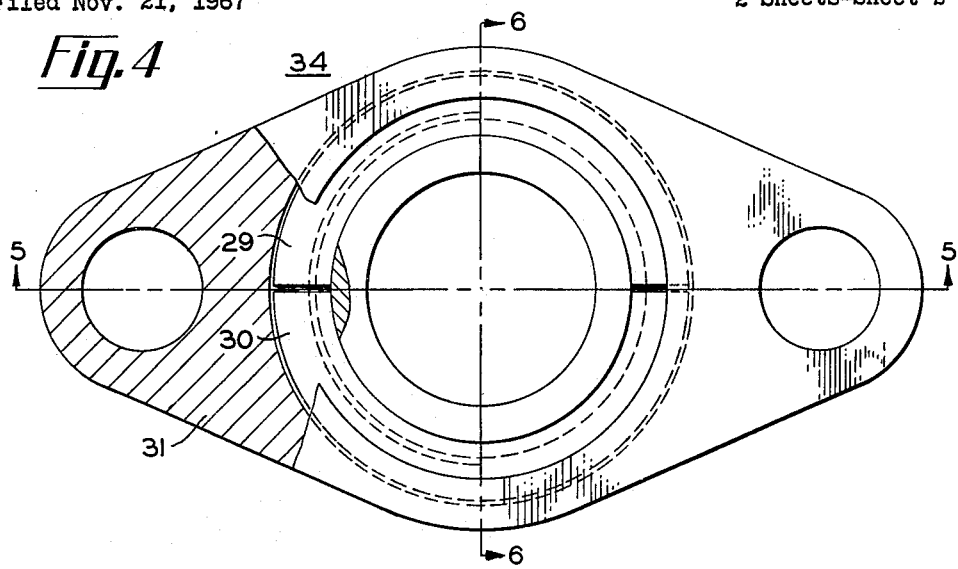
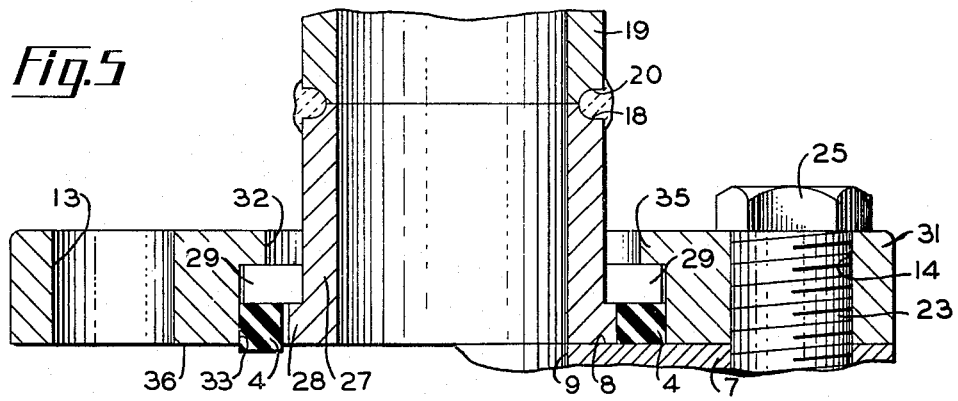
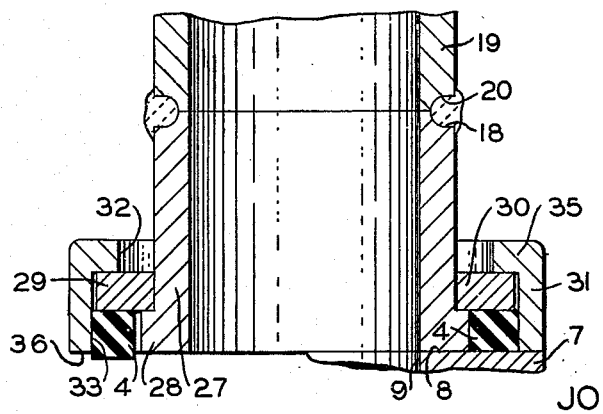
INVENTOR.
JOHN R. REISS
BY
*A. A. Steinmiller*
ATTORNEY

United States Patent Office 3,498,643
Patented Mar. 3, 1970

3,498,643
SWIVEL FLANGED FITTING
John R. Reiss, East McKeesport, Pa., assignor to Westinghouse Air Brake Company, Wilmerding, Pa., a corporation of Pennsylvania
Filed Nov. 21, 1967, Ser. No. 684,720
Int. Cl. F16l 5/00, 27/00
U.S. Cl. 285—189                         6 Claims

ABSTRACT OF THE DISCLOSURE

A two-piece adjustable butt welded fitting in which the flange member is made removable from the swivel member by the use of two semicircular members disposed between an inturned flange on the flange member and an outturned flange on the swivel member, the diameter of the outturned flange being less than that of the inturned flange whereby the swivel member is insertable through the flange member in the absence of the two semi-circular members.

BACKGROUND OF INVENTION

Adjustable butt welded fittings presently in use comprise a flange member, a swivel member, and a gasket. When this type of threadless fitting is used to connect a pipe to a flat surface such as, for example, the bolting face of a pipe bracket, the flange member is slid over one end of the pipe after which this end of the pipe is welded to the barrel end of the swivel. To thereafter effect a connection of the pipe to the pipe bracket it is often necessary that both the flange member and the swivel member to which the pipe has been welded be inserted through an opening in a structural member it being apparent that the opening must be slightly larger than the flange member and therefore substantially larger than the swivel member. It is further apparent that as the size of an opening in a structural member increases the strength of the member decreases. It follows, therefore, that an adjustable butt welded fitting which would require an opening in a structural member substantially the size of the swivel member, which is much less in size than the flange member, would be most desirable.

Accordingly, it is the general purpose of this invention to provide an adjustable butt welded fitting having a flange member which can be readily installed on and removed from a swivel member subsequent to welding one end of a pipe to the swivel member, thereby enabling the swivel member and pipe to be inserted through an opening in a structural member substantially the size of the swivel member and allowing the flange member to be later installed on the swivel member.

SUMMARY OF THE INVENTION

According to the invention, a two-piece fitting is provided having a flange member and a swivel member, the flange member having an inturned flange of larger diameter than an out-turned flange on the swivel member whereby the flange member may be slipped over or removed from the swivel member. Two substantially semi-circular members of metal which may be permanently magnetized are installed together as a collar around the shank of the swivel so as to be supported on the out-turned flange of the swivel member, the diameter of the collar formed by the semi-circular members being larger than the diameter of the inturned flange on the flange member.

Securement of the flange to a pipe bracket or valve body thus correspondingly secures the swivel member via the semi-circular members locked between the flanges on the swivel and flange members. A grommet ring may be provided in surrounding relation to the flange on the swivel member to provide a seal.

In the accompanying drawings:

FIG. 1 is a top plan view, partly in section, of a novel adjustable butt welded fitting.

FIG. 2 is an elevational cross-sectional view, taken along the line 2—2 of FIG. 1 and looking in the direction of the arrows. In addition, the right-hand end of the fitting is shown secured to a member having a flat face thereon in abutting relationship to the flange member to illustrate the condition of the O-ring sealing gasket therein as distinguished from the free or unsecured condition of this gasket shown at the left-hand end of the fitting.

FIG. 4 is a top plan view, partly in section, showing a second embodiment of an adjustable butt welded fitting.

FIG. 5 is an elevational cross-sectional view, taken along the line 5—5 of FIG. 4 and looking in the direction of the arrows showing, in addition, the compressed and uncompressed condition of the gasket.

FIG. 6 is an elevational cross-sectional view, taken along the line 6—6 of FIG. 4 and looking in the direction of the arrows showing certain details not made apparent in FIG. 5.

Figure 1:
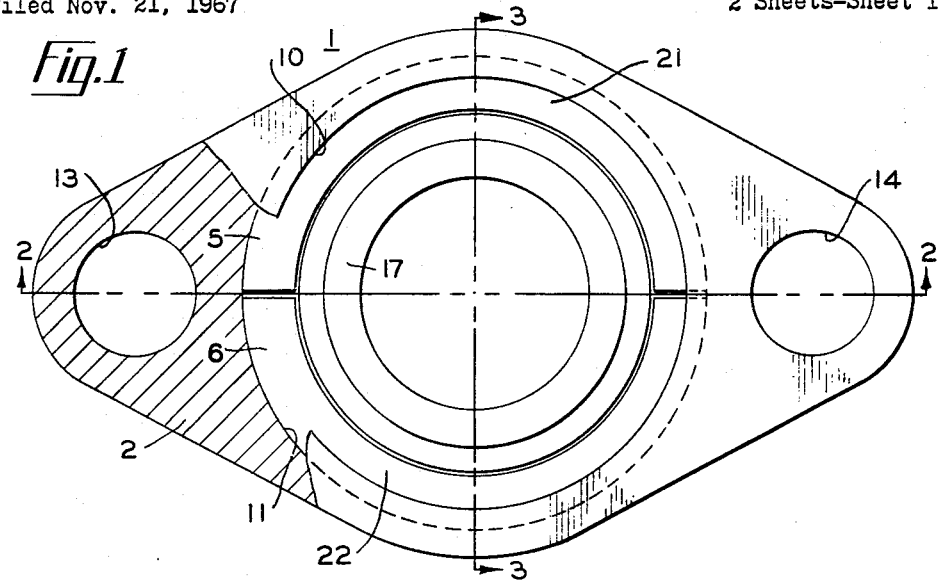
Figure 2:
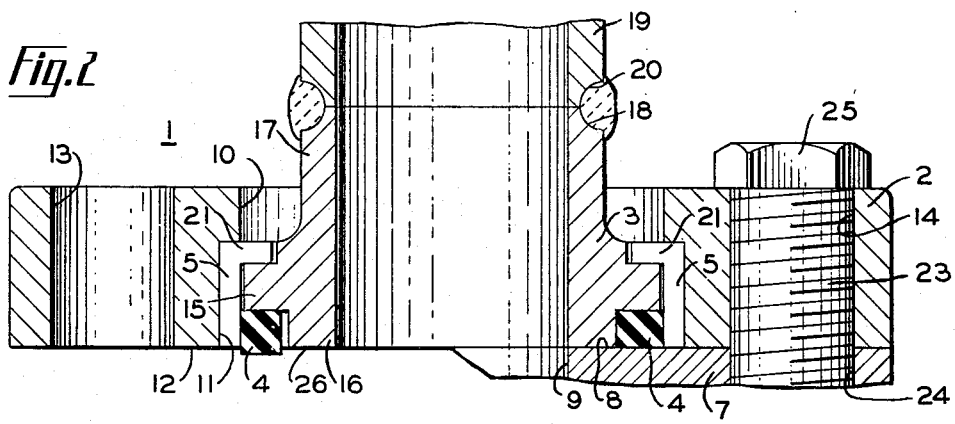
Figure 3:
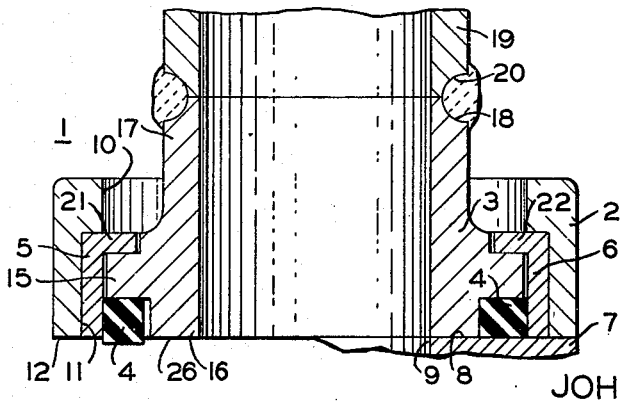
FIG. 3 is an elevational cross-sectional view, taken along line 3—3 of FIG. 1 and looking in the direction of the arrows, showing certain details not made apparent in FIG. 2.

In FIGS. 1, 2 and 3, the adjustable butt welded fitting 1 shown comprises a flange member 2, a swivel member 3, a yieldable packing or gasket 4, and two identical substantially semi-circular members 5 and 6 which cooperate to form a collar. This adjustable butt welded fitting 1 is shown in FIGS. 2 and 3 of the drawings associated with a device such as, for example, a fluid brake cylinder head 7 having a flat coupling or bolting face 8 surrounding an opening 9 in the brake cylinder head. Only the right-hand portion of the flange member 2 and the swivel member 3 are shown as abutting the bolting face 8 to illustrate on the left-hand side of FIGS. 2 and 3 the uncompressed condition of the gasket 4 before these members are secured in abutting relation to the bolting face 8.

The flange member 2 is provided with an inturned flange having a central bore 10 and a coaxial counterbore 11 that extends into the flange member 2 from a smooth or finished face 12 thereon that abuts the bolting face 8, as shown in FIGS. 2 and 3. This flange member 2 is also provided with two spaced-apart smooth bores 13 and 14 the centers of which lie on the longitudinal center line of the member 2.

Intermediate its ends, the swivel member 3 comprises an outturned flange 15 the diameter of which is slightly less than the diameter of the bore 10 in the flange member 2 to provide for the passage of the member 2 over the flange 15 when assembling the adjustable butt welded fitting 1 in a manner hereinafter described in detail. As shown in FIGS. 2 and 3 of the drawings, the swivel member 3 further comprises a cylindrical portion 16 extending downward from the lower side of the flange 15 and a shank or sleeve portion 17 extending upward from the upper side of this flange 15 and through the bore 10 a distance substantially greater than the length of this bore. The upper end of this sleeve or barrel portion 17 is provided with a fillet 18 in which is received molten metal from a welding rod when one end of a pipe 19 having in this one end a corresponding fillet 20 is placed in abutting relation to this upper end of the sleeve portion 17 and welded thereto by the molten metal which, upon solidifying as the result of subsequent cooling, fills the semi-circular cavity formed by the adjacent fillets 18 and 20.

Subsequent to welding the pipe 19 to the sleeve portion 17 of the swivel member 3 in the manner described above, the end of the pipe 19 carrying the swivel member 3 welded thereto will be inserted through an opening provided in a structural member, if this is necessary, to correctly align the pipe and swivel member with respect to the brake cylinder head 7 for effecting a connection thereto by means of the adjustable butt welded fitting 1.

Following aligning the pipe 19 and the swivel member 3 with respect to the brake cylinder head 7, and with the swivel member 3 disposed a distance from the bolting face 8 on the head 7 somewhat greater than the thickness of the flange member 2, this flange member 2 is slipped over the swivel member 3, the flange 15 on the member 3 passing through the bore 10 in the member 2.

Next, with the flange member 2 so positioned with respect to the swivel member 3 that the finished face 12 on the member 2 is disposed a substantial distance above the flange 15 on the member 3, as viewed in FIGS.. 2 and 3, the gasket 4 is disposed in surrounding relation to the cylindrical portion 16 of the swivel member 3 and in abutting relation with the lower face of the flange 15. It will be noted from the left-hand side of FIGS. 2 and 3 that, with flange member 2 and swivel member 3 in the position described above, and the gasket 4 disposed in surrounding relation to the cylindrical portion 16, the internal diameter of the gasket 4 is slightly greater than the external diameter of the cylindrical portion 16, and the thickness of the gasket 4 is slightly greater than the length of the cylindrical portion 16.

Following placing the gasket 4 in surrounding relation to the cylindrical portion 16, the two identical substantially semi-circular members 5 and 6 of L-shape in cross-section, which may be of metal previously permanently magnetized, are disposed in surrounding relation to the gasket 4 so that an inturned flange 21 formed integral with the upper end of member 5 and an inturned flange 22 formed integral with the upper end of member 6, as viewed in FIG. 3, about the upper side of the outturned flange 15 of the swivel member 3. If the members 5 and 6 are permanently magnetized, the magnetic attraction serves to assist in holding them in place on the swivel during the assembly and the securement of the fitting. It will be noted from FIG. 3 that the vertical height of the semi-circular members 5 and 6 is equal to the length of the counterbore 11 in the flange member 2 so that, when the adjustable butt welded fitting is assembled, the flanged end of these members abuts a shoulder formed by the upper end of this counterbore 11 and the opposite or lower end of these members is flush with the finished face 12 on the flange member 2.

Furthermore, it will be noted from FIG. 1 that the arcuate length of the members 5 and 6 is slightly less than that of a true semi-circle, this being the result of forming these members by machining a circular member having an inturned flange from bar or tube stock and subsequently sawing or otherwise cutting the circular member diametrically in two to form these members 5 and 6. Consequently, in the assembled position, there is a slight gap between each pair of adjacent ends of the substantially semi-circular members 5 and 6.

Now the flange member 2 may be moved relative to the swivel member 3 until the shoulder formed at the inner or upper end of the counterbore 11 in the flange member 2 abuts the upper end, as viewed in FIGS. 2 and 3, of the semi-circular members 5 and 6.

Following thus positioning the swivel member 3, gasket 4, semi-circular members 5 and 6, and the flange member 2, one of a pair of cap screws 23, only one of which is shown in FIG. 2, is inserted through each of the smooth bores 13 and 14 in the flange member 2 and thereafter screw threaded into one of a pair of screw-threaded bores 24, only one of which is shown in FIG. 2, provided in the brake cylinder head 7, it being understood that this pair of screw-threaded bores in the brake cylinder head 7 is coaxial with the smooth bores 13 and 14 in the flange member 2.

Subsequent to screw-threading the cap screws 23 into the screw-threaded bores 24 as far as is possible by means of the thumb and forefinger of a mechanic applied to head 25 of the cap screws 23, the mechanic will apply a wrench to the head 25 of each cap screw 23 and thereafter, by means of the wrench, rotate the respective cap screw in the direction to cause it to be further screwthreaded into the corresponding screw-threaded bore 24. When the cap screws 23 are thus manually rotated by the mechanic, the gasket 4 is compressed against the bolting face 8 on the brake cylinder head 7 as the flange member 2 and swivel member 3 are drawn into contact with this face 8. Consequently, as the finished face 12 on the flange member 2 and a finished face 26 on the lower end of cylindrical portion 16 of swivel member 3 are brought into contact with the bolting face 8 on the brake cylinder head 7, the gasket 4 is compressed into the groove formed by the bolting face 8, the outer periphery of the cylindrical portion 16, the bottom of the flange 15 and the inside arcuate surface of the semi-circular members 5 and 6 so that this gasket is squeezed into this groove from the position in which it is shown on the left-hand side of FIGS. 2 and 3 to the position shown on the right-hand side of those figures. In this compressed condition, the circular gasket 4 makes a fluid tight seal between the brake cylinder head 7 and the adjustable butt welded fitting 1.

It will be apparent that, when it is desired to disconnect the adjustable butt welded fitting 1 from the brake cylinder head 7, all that is necessary is to reverse the steps described above.

According to a second embodiment of the invention, a swivel member 27 having no cylindrical portion extending downward from the lower side of an outturned flange 28 integral therewith replaces the swivel member 3 shown in FIGS. 2 and 3, two identical substantially semi-circular members 29 and 30 which are rectangular in cross section replace the substantially semi-circular members 5 and 6 shown in FIGS. 2 and 3 as L-shaped in cross section, and a flange member 31 having a bore 32 and a counterbore 33 of smaller diameter than the bore 10 and counterbore 11 in the flange member 2 to provide an adjustable butt welded fitting 34 that functions substantially the same as the adjustable butt welded fitting 1 shown in FIGS. 1, 2 and 3. Accordingly, like reference numerals have been used to designate the structure shown in FIGS. 4, 5 and 6 which is identical with that shown in FIGS. 1, 2 and 3 and already described. Only such features of the structure of the embodiment of FIGS. 4, 5 and 6 which differ from that of the embodiment of FIGS. 1, 2 and 3 will be hereinafter described.

According to the embodiment of the invention shown in FIGS. 4, 5 and 6, the adjustable butt welded fitting 34 comprises the gasket 4, the swivel member 27, the semi-circular members 29 and 30, and the flange member 31 which replace respectively, the swivel member 3, the semi-circular members 5 and 6 and the flange member 2 shown in FIGS. 1, 2 and 3.

It will be noted that the diameter of the flange 28 of the swivel member 27 is the same as the diameter of the cylindrical portion 16 of the swivel member 3 shown in FIGS. 2 and 3 since the gasket 4 shown in FIGS. 5 and 6 is disposed about the flange 28 and within the counterbore 33 of the flange member 31. It will also be noted from FIGS. 5 and 6 that the semi-circular members 29 and 30, which are rectangular in cross section, as hereinbefore stated, rest partly on the flange 28 of the swivel member 27 and partly on the gasket 4. Therefore, when the elements that make up the adjustable butt welded fitting 34 are assembled in substantially the same manner as hereinbefore described for the adjustable butt welded fitting 1, an inturned flange 35 on the flange member 31 is effective as the cap screws 23 are tightened to force a finished face 36 on the bottom of the flange member 31 into contact with the bolting face 8 on the brake cylinder head 7, via the semicircular members 29 and 30, to compress the gasket 4 into the groove formed by the bolting face 8, the outer periphery of the flange 28, the bottom of the semi-circular members 29 and 30, and the inside arcuate surface of the counterbore 33 in the flange member 31 so that this gasket is squeezed into this groove from the position in which it is shown on the left-hand side of FIGS. 5 and 6 to the position shown on the right-hand side of these figures. As in the first embodiment of the invention, the circular gasket 4 in this compressed condition makes a fluid tight seal between the brake cylinder head 7 and the adjustable butt welded fitting 34.

Furthermore, as with the first embodiment of the invention, when it is desired to disconnect the adjustable butt welded fitting 34 from the cylinder head 7, all that is necessary is to reverse the steps of assembling or connecting this fitting 34 to the cylinder head 7.

Having now described the invention, what I claim as new and desire to secure by Letters Patent, is:

1. A fitting assembly comprising:
   (a) a flange member having a face adapted to be secured in abutting contact with the face of a cooperating member, and being provided with a bore and a coaxial counterbore open to said face, said bore and counterbore cooperating to form an inturned flange,
   (b) a swivel member having a shank disposed coaxially within said bore and counterbore and an outturned flange extending from said shank and being of such diameter relative to the said inturned flange as to provide for the insertion of said outturned flange through said bore, and
   (c) two substantially semi-circular members cooperatively disposed in the form of a collar within said counterbore of said flange member, about the shank of said swivel and interposed between said inturned and outturned flanges whereby to interlock said flange member and said swivel member, said semi-circular members in assembled relation having an outer diameter closely conforming to the diameter of said counterbore in said flange member, an internal diameter substantially less than the outer diameter of said flange on said swivel member, and being substantially equal in axial length to the axial length of said counterbore in said flange member thereby to limit shearing stresses on said semi-circular members and on said flange on said swivel.

2. A fitting assembly comprising:
   (a) a flange member having a face adapted to be secured in abutting contact with the face of a cooperating member, and being provided with a bore and a coaxial counterbore open to said face, said bore and counterbore cooperating to form an inturned flange,
   (b) a swivel member having a shank disposed coaxially within said bore and counterbore and an outturned flange extending from said shank, the diameter of which flange is less than the diameter of the bore in the inturned flange of said flange member, and
   (c) two substantially semi-circular members cooperatively disposed in the form of a collar within said counterbore of said flange member, about the shank of said swivel member and interposed between said inturned and outturned flanges, said semi-circular members in assembled relation having an outer diameter closely conforming to the diameter of said counterbore in said flange member, an internal diameter substantially less than the outer diameter of said flange on said swivel member, and being substantially equal in axial length to the axial length of said counterbore in said flange member, said swivel member and said flange member having faces in coplanar relation for concurrent abutting contact with the face of the member to which the flange member is secured, whereby to limit the shearing stresses on said semi-circular members and on said flange on said swivel member.

3. A fitting assembly, as claimed in claim 1, further characterized in that said semi-circular members are of metal and permanently magnetized.

4. A fitting assembly, as claimed in claim 1, further characterized in that said semi-circular members, the outturned flange of said swivel member, and the wall of the counterbore in said flange member cooperate to form a groove open to the face of the flange member, and in that an annular resilient sealing ring of rectangular cross-section is disposed in said groove, the thickness of said sealing ring being substantially greater than the depth of said groove and the width of said ring being substantially less than the width of said groove, whereby said ring is compressible into said groove so as to substantially fill said groove upon securing said flange member to the cooperating member.

5. A fitting assembly, as claimed in claim 1 further characterized in that the inner wall surface of said semi-circular members, one side of the outturned flange of said swivel member and the shank of said swivel member cooperate to form a groove open to the face of the flange member, and in that an annular sealing ring of rectangular cross-section is disposed in said groove, the thickness of said sealing ring being substantially greater than the depth of said groove and the width of said ring being substantially less than the width of said groove, whereby said ring is compressible into said groove so as to substantially fill said groove upon securing said flange member to the cooperating member.

6. A fitting assembly, as claimed in claim 1, further characterized in that said outturned flange on said swivel member extends radially outward at one end of said shank.

References Cited

UNITED STATES PATENTS

| 2,402,868 | 6/1946 | Boyle | 285—415 |
| 2,764,431 | 9/1956 | Wilde | 285—415 |
| 2,912,263 | 11/1959 | Christy | 285—9 |
| 3,113,792 | 12/1963 | Brown | 285—415 |
| 3,414,297 | 12/1968 | Pollia | 285—415 |

DAVID J. WILLIAMOWSKY, Primary Examiner

WAYNE L. SHEDD, Assistant Examiner

U.S. Cl. X.R.

285—368, 412